United States Patent [19]

Haneda

[11] 4,447,889
[45] May 8, 1984

[54] METHOD FOR CONTROLLING DISPLAY OF OUTPUT OF A PROGRAMMABLE DEVICE

[75] Inventor: Isamu Haneda, Nara, Japan

[73] Assignee: Sharp Kabushiki Kaisha, Osaka, Japan

[21] Appl. No.: 279,197

[22] Filed: Jun. 30, 1981

[30] Foreign Application Priority Data

Jun. 30, 1980 [JP] Japan .................................. 55-89774

[51] Int. Cl.³ ............................ G06F 3/12; G06F 3/14
[52] U.S. Cl. .................................................. 364/900
[58] Field of Search ... 364/200 MS File, 900 MS File

[56] References Cited

U.S. PATENT DOCUMENTS 4,071,910 1/1978 Stockebrand et al. ............... 364/900

Primary Examiner—Thomas M. Heckler
Attorney, Agent, or Firm—Birch, Stewart, Kolasch & Birch

[57] ABSTRACT

A system for controlling a display panel in an electronic programmable calculator or the like determines whether a printer is connected thereto. If the printer is connected for operation, data or instructions are transmitted to the printer for printing. Otherwise, data or instructions are displayed on the calculator display.

4 Claims, 6 Drawing Figures

METHOD FOR CONTROLLING DISPLAY OF OUTPUT OF A PROGRAMMABLE DEVICE

BACKGROUND OF THE INVENTION

This invention relates to a method for controlling a display panel of an electronic programmable calculator and a personal computer.

A personal computer is generally equipped with a cathode ray tube (this is referred to as "CRT" hereinafter) so that data or a plurality of programs may be displayed at one time, while an electronic programmable calculator is generally capable of displaying no more than one line of data or program.

With a programmable calculator having a printer connected thereto, programs or data in locations as specified by the programs may be completely displayed on the printer without the need to interrupt execution of program steps. However, in the absence of a printer connected thereto, the programs or the data as specified by the programs need be displayed from line to line and execution of the programs need be interrupted during display.

Furthermore, the personal computer with a CRT is not always capable of displaying all of the program or data. In the absence of the printer connected thereto, it is preferred that execution of the program be interrupted when the program or data are displayed on the CRT in a manner similar to the programmable calculator.

In any case, which of the displays, the CRT or the printer, is employed in displaying the programs or data is determined by instructions. This leads to complexity of the instructions and it is therefore desirable that a single instruction be of use for all of the output operations and selection of which output device is to be used dependent upon whether the printer is connected.

SUMMARY OF THE INVENTION

Accordingly, it is an object of the present invention to provide a new display method by which data or programs are displayed on a printer when the printer is connected to the data processing device and displayed on a display panel or CRT in the absence of the printer. A specific embodiment of the present invention will now be described by reference to the accompanying drawings.

DETAILED DESCRIPTION OF THE PREFERRED EMBODIMENT

Figure 1:
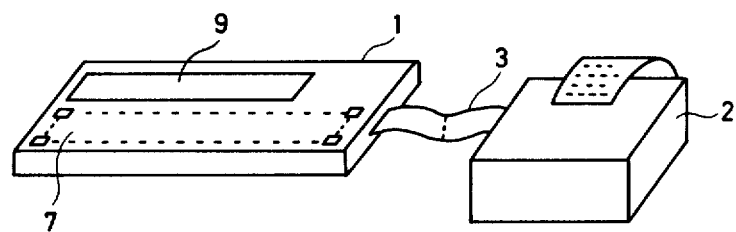
FIG. 1 is a perspective view of an electronic type programmable calculator having a printer connected thereto.

FIG. 1 is a perspective view of an electronic programmable calculator embodying the present invention, which generally includes a programmable calculator body (1), a printer (2) and a cable (3) for connection between the programmable calculator (1) and the printer (2).

Figure 2:
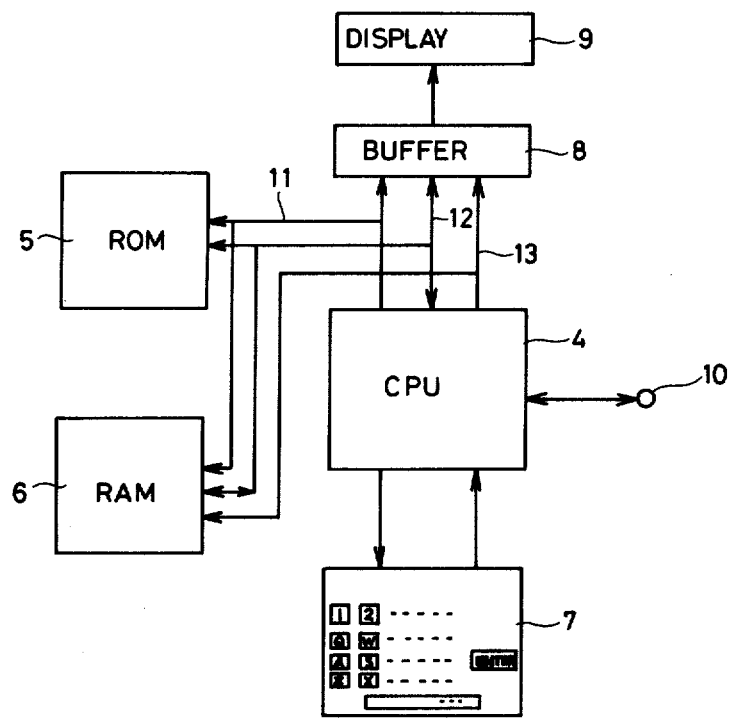
FIG. 2 is a schematic block diagram of the programmable calculator.

FIG. 2 is a schematic block diagram showing the programmable calculator (1) in further detail. The calculator includes a central processing unit (this referred to as "CPU" hereinafter) for executing input and output controls and various arithmetic operations, a read only memory (this referred to as "ROM" hereinafter) (5) for containing operational sequences such as a monitor and an interpreter, a random access memory (this is referred to as "RAM" hereinafter (6) consisting of an input buffer, a program memory and one or more data memories, a keyboard (7) for introduction of input signals indicative of letters, numerals or symbols, a display memory and output buffer (8), a display panel (9) capable of displaying only one line of data or program, a signal connector (10) for connection with the printer (2), an address but (1) for specifying the address of the ROM (5), the RAM (6), the memories and the output buffer (8) for read and write operations and a data bus (12) for reading and writing data on the address as specified by the address bus (11). A read/write signal (this is referred to as "R/W" hereinafter) is developed for selection of read or write operation.

Figure 3:
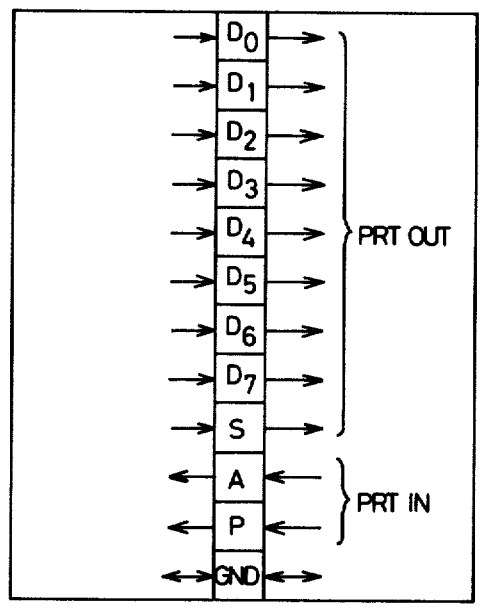
FIG. 3 is an enlarged view of a signal connector.

FIG. 3 is an enlarged view of the signal connector (10) which is constituted by terminals $(D_0)$, $(D_1)$ ... $(D_7)$ for transmission of function codes such as codes of characters to be printed and carriage return codes to the printer, a terminal (S) for transmission of strobe signals, a terminal (A) for receipt of a response signal from the printer, a terminal (P) for receipt of a signal indicative of whether the printer is in connected relationship, and a ground terminal (GND).

The signal indicative of whether the priner is in connecting relationship bears a logic "1" level in the presence of the printer connected thereto and a logic "0" level in the absence of the printer.

Figure 4:
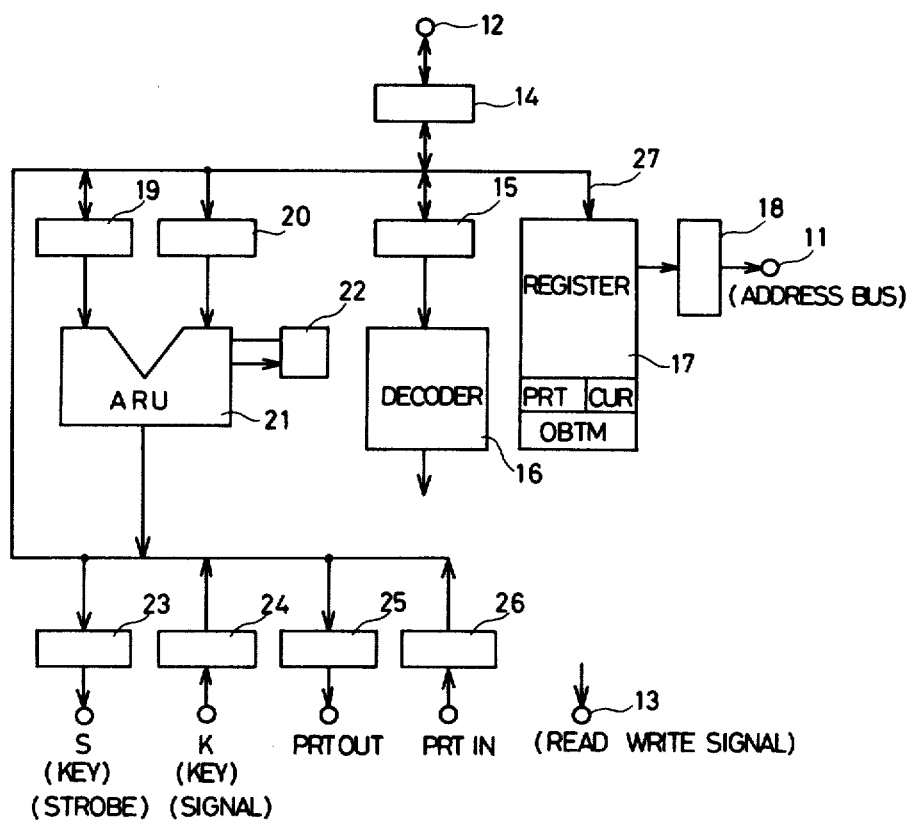
FIG. 4 is a schematic block diagram of a central processing unit.

FIG. 4 is a schematic block diagram of the CPU (4) which includes a data buffer (14) leading to the data bus (12), an instruction register (15), a register (17), and accumulator (19), a temporary register (20), an arithmetic circuit (21), a strobe signal buffer (23), a key signal buffer (24), a buffer (25) for holding output signals to the printer and a buffer (26) for holding signals from the printer, all of which (except the data buffer) are connected to the data buffer (14) via an internal data bus (27). The CPU further includes an address buffer (18) connected between the register (17) and the address buffer (11), a decoder (16) for decoding the contents of the instruction register (15) and a carry circuit (22) connected to the arithmetic circuit (21). The register (17) includes a flag (PRT) for indicating whether the program steps have been interrupted after the data or program steps were displayed on the display panel, a flag (CUR) for indicating a cursor, a register (OBTM) for indicating the last address of the program contained in the RAM (6).

When the flag (CUR) is "1", the cursor is present on the display panel and a key input is loaded at a position as designated by the cursor while the cursor is moving to the right. On the other hand, when the flag (CUR) is "0", no cursor is present on the display panel and the previous contents of the display panel are cleared for introduction of a new input introduced via the keyboard.

The flag (PRT) at a "1" level indicates that the calculator has interrupted execution of the program steps and if the program steps are to be re-executed, then an ENTER key is actuated to reset the flag (PRT) to "0" and make the calculator ready to re-execute the program steps.

Figure 5:
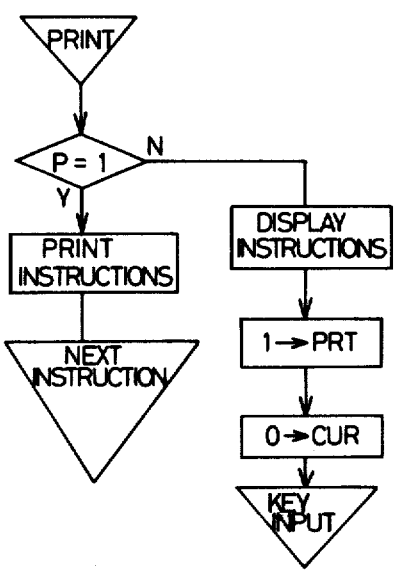
FIG. 5 is a flow chart of the procedure by which data as specified by a program instruction is printed or displayed.

A flow chart of FIG. 5 depicts the procedure by which data as identified by an instruction during execution of the program steps are printed by the printer (2) or displayed on the display panel (9). In other words, after the instruction PRINT has been decoded, it is determined whether an input to the terminal (P) is "1" or "0" is decided. If the input is "1", then the data are outputted via the priner (2) and then the calculator proceeds with execution of a next instruction statement.

If "0", the data are outputted via the display panel (9) and the flag (PRT) is placed into "1" position to interrupt execution of the program steps. Then, the flag (CUR) is reset to "0" and the calculator proceeds with a routine for decoding an input via the keyboard (7).

When continuation of execution of the program steps is desirable, all that is necessary is to actuate the ENTER key to reset the flag (PRT) to "0."

In the event that error, such as missing data at the specified address, occurs during printing or displaying, the calculator proceeds with a routine for correcting error without executing displaying or printing. Furthermore, when the data are of a length exceeding the capacity of the display panel (9), the display panel is driven to display the portion of the data beginning with the first address and ending with the final location where the display panel is capable of displaying.

Figure 6:
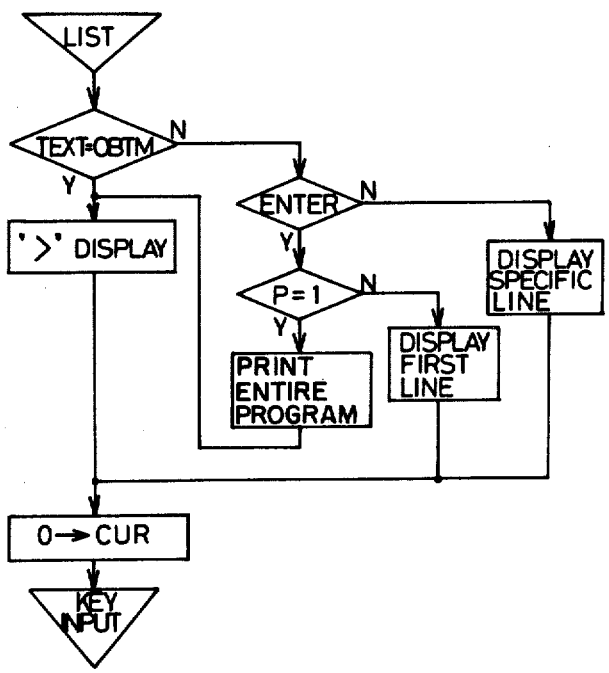
FIG. 6 is a flow chart of the procedure by which programs are printed or displayed.

The procedure by which the program steps are printed on the printer (2) or displayed on the display panel (9) is conducted as shown in a flow chart of FIG. 6.

After fetching an instruction LIST, the leading address (TEXT) of the program memory within the RAM (6) is compared with the final address (OBTM) of the program to decide whether any program is contained within the program memory. When TEXT = OBTM, no program is contained within the program memory so that only ">" (prompt) is displayed and the flag (CUR) is reset to "0" to initiate the key input routine.

When TEXT ≠ OBTM, because of the program contained within the memory, it is determined whether the key actuated following the LIST instruction is ENTER. If other keys are actuated, the key codes following the LIST instruction are used as data identifying the line where a program is present and the program line in agreement with that key code is located and displayed. It is noted that the key codes are used as the data directly or after execution of required operations. If the display panel cannot display all of the program lines, it is first necessary to display the portion of the program from the first line to the last line where the display panel is able to display. In the event that no corresponding program line is found, the calculator proceeds with an error routine, skipping the display operation.

In the case where the ENTER key is actuated after the LIST instruction, it is determined whether the flag (P) is "0" or "1". When it is "1", all of the program steps are printed and ">" is displayed and then the flag (CUR) is reset to "0" for the key input procedure. When it is "0", the first line of the program is displayed at its maximum permissible length and the flag (CUR) is reset to "0" for the key input procedure.

Although the foregoing has described and illustrated an embodiment for use with an electronic programmable calculator, it is obvious that the invention is equally applicable to a personal computer, a detailed description of such being omitted.

As stated previously, pursuant to the concept of the present invention, whether the data or program is to be displayed on a printer or the display panel built in the calculator or computer is determined by whether the printer is connected thereto. Furthermore, execution of the program steps may be interrupted for displaying the data or program steps.

I claim:

1. A programmable electronic device comprising:
   storing means for storing program instructions;
   executing means connected to said storing means for executing said program instructions for processing data and;
   output means connected to said executing means for outputting program instructions and data processed by said device;
   said output means comprising electronic display means, and printing means selectively connectable to said device;
   said output means further comprising first means for determining if said printing means is connected to said device; and
   second means responsive to said first means for actuating said printing means for outputting data and for permitting said executing means to execute program instructions following said outputting when said printing means is connected to said device, and for actuating said electronic display means and for interrupting operation of said executing means when said printer means is not connected to said device.

2. A programmable electronic device as in claim 1, further comprising means for retrieving a program from said storing means;
   said second means being further responsive to said first means for actuating said printing means for outputting the complete retrieved program when said printing means is connected to said device, and for actuating said electronic display means for displaying the first line of said program when said printing means is not connected to said device.

3. A programmable electronic device as in claim 2, wherein said second means further actuates said printing means to output the entire program when said printing means is connected to said device, and actuates said electronic display to display as much of said program as possible when said printing means is not connected to said device.

4. A method for outputting information from a programmable electronic device, said device comprising electronic display means, and printing means selectively connectable to said device, comprising the steps of:
   determining if said printing means is connected to said device and providing a first signal if said printing means is connected and a second signal if said printing means is not connected;
   responding to said first signal for actuating said printer means to output information when said first signal is provided and responding to said second signal for actuating said electronic display to output information when said second signal is provided.

* * * * *